UNITED STATES PATENT OFFICE 2,396,626

PIMELIC ACID DERIVATIVES DISUBSTITUTED IN THE γ-POSITION AND A PROCESS OF PREPARING SAME

Georg Wiest, Ludwigshafen-on-the-Rhine, and Heinrich Glaser, Bonn, Germany; vested in the Alien Property Custodian No Drawing. Application January 17, 1941, Serial No. 374,864. In Germany February 12, 1940

9 Claims. (Cl. 260—464)

The present invention relates to pimelic acid derivatives disubstituted in the γ-position and a process of preparing same.

We have found that pimelic acid derivatives, i. e. pimelic acid diesters, diamides and pimelic acid dinitrile, which are disubstituted in the γ-position may be prepared very easily and with good yields by causing a functional derivative of a carboxylic acid containing a reactive $CH_2$-group in α-position to the modified carboxylic acid group to act on more than the equimolecular amount of a functional derivative of acrylic acid, in particular of acrylic acid nitrile, an acrylic acid ester or an acrylic acid amide, in the presence of an alkaline catalyst.

Functional carboxylic acid derivatives containing a reactive $CH_2$-group are in particular the esters, amides and nitriles of acetic acid the methyl group of which is substituted by a radicle containing multiple bonds, the latter being attached to the atom which is adjacent to the $CH_2$-group. Such radicles which are sometimes defined as acidifying radicles are for example the

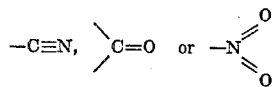

group and aryl radicles. Suitable starting materials of this kind are for example the esters, amides and nitrile of cyanoacetic acid, aceto acetic acid, malonic acid or phenyl acetic acid.

Suitable functional derivatives of acrylic acid are acrylic acid nitrile, acrylic acid methyl, ethyl or butyl ester and other alkyl esters, acrylic acid amide, acrylic acid methyl amide and other amides derived from primary or secondary amines.

The reaction consists in the addition of two molecular proportions of the acrylic acid derivative to one molecular proportion of the carboxylic acid derivative containing a reactive $CH_2$-group and proceeds in accordance with the following equation showing the reaction between acrylic acid nitrile and cyano acetic acid ethyl ester:

$2CH_2=CH-CN + NC-CH_2-COOC_2H_5 \longrightarrow$

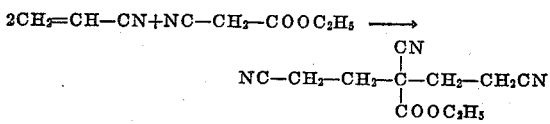

γ-cyano pimelic acid dinitrile-γ-carboxylic acid ethyl ester

The reaction products therefore constitute functional derivatives of pimelic acid which are disubstituted in the γ-position, one substituent being a modified carboxylic acid group, the other being a radicle containing multiple bonds. They correspond to the general formula:

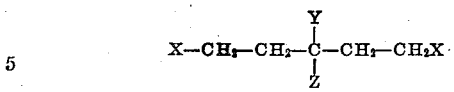

wherein X and Z stand for modified carboxylic acid groups, and Y stands for the radicle containing multiple bonds.

In addition to these bimolecular addition products there may be formed as by-products compounds formed by the addition of one molecular proportion of the acrylic acid derivative to one molecular proportion of the carboxylic acid derivative containing a reactive $CH_2$-group, in particular if less than two molecular proportions of the acrylic acid derivative are allowed to act on one molecular proportion of the other starting material. These monomolecular addition products may easily be converted into bimolecular addition products by bringing them into contact with acrylic acid derivatives in the presence of alkaline catalysts. It is also possible to add these monomolecular addition products to the starting materials used in the practice of our invention.

The amount of monomolecular addition product in the reaction mixture depends on the nature of the starting materials actually used. For example, when bringing into contact acrylic acid nitrile with cyano acetic acid ethyl ester, the bimolecular product is almost exclusively formed even if using only a slight excess of acrylic acid nitrile over cyano acetic acid ethyl ester. Under these conditions only part of the ester will react, the remaining amount being left unchanged. On the other hand, when allowing one molecular proportion of aceto acetic acid ethyl ester to act on little more than one molecular proportion of acrylic acid nitrile, both addition products will be found in the reaction mixture. It is, therefore, preferable to use at least two molecular proportions of the acrylic acid derivatives for one molecular proportion of the other starting material, if it is intended to obtain a reaction product containing the bimolecular addition product on the main constituent.

The reaction may be carried out in the presence of substances inhibiting the polymerization of acrylic acid derivatives, e. g. copper, hydroquinone and the like.

The addition of acrylic acid derivatives to carboxylic acid derivatives containing $CH_2$-groups proceeds so smoothly that the reaction may be started simply by adding one of the starting materials to the other starting material admixed with the catalyst. The reaction proceeds with the evolution of heat. Since acrylic acid derivatives are liable to be polymerized at high temperatures, temperatures exceeding about 100° C., preferably those exceeding 70° C., should not be used. If necessary, the reaction mixture has to be cooled during the reaction. When the vigor of the reaction has abated, it may be suitable to gently heat the reaction mixture in order to accelerate the reaction. The reaction may be carried out in the presence of inert solvents or diluents.

Various alkaline substances may serve as the catalyst. Thus, the alkali and alkaline earth metals themselves and their compounds having an alkaline reaction are suitable, for example, their oxides, hydroxides or alcoholates. Basic nitrogen compounds may also be used, as for example pyridine. The amount of catalyst to be used may be very small; generally speaking few per cents or less than one per cent thereof, calculated on the amount of the carboxylic acid derivative containing a reactive $CH_2$-group are sufficient. It is not necessary and does not offer any advantage to use an amount corresponding to more than 10 per cent of the acid derivative. When using alkali metals as the alkaline catalyst, the course of the reaction is even unfavorably affected by using large amounts, e. g. more than 50 per cent, of the catalyst. For example, when using an amount of alkali metal equimolecular to the amount of the carboxylic acid derivative containing a reactive $CH_2$-group which amount would correspond for example to the use of sodium cyano acetic acid ester, two molecular proportions of the acrylic acid derivative are no longer added.

The products obtainable according to our invention may be used for the production of disubstituted pimelic acids by saponifying the modified carboxylic acid groups. The esters of these pimelic acids are most suitable as plasticizers or solvents.

The following examples will further illustrate how our invention may be carried out in practice. The invention, however, is not restricted to these examples. The parts are by weight.

*Example 1*

530 parts of acrylic acid nitrile are allowed to flow into 800 parts of malonic acid diethyl ester to which 1 part of metallic sodium has been added, while stirring vigorously. The temperature is kept at 30–40° C. After having allowed the reaction mixture to stand for 12 hours, it is diluted with chloroform and extracted several times with water to which a small amount of acetic acid has been added. The chloroform solution is dried with anhydrous sodium sulfate, the chloroform distilled off, and the residue distilled in vacuo. After unchanged starting materials have been distilled off, there are obtained 450 parts of a colorless liquid, boiling at 133–134° C. under 3 millimeters pressure, constituting the monomolecular addition product ω-cyanethyl malonic acid diethyl ester, and 130 parts of a colorless oily liquid, boiling at 210–212° C. under 5 millimeters pressure which constitutes pimelic acid dinitrile-γ,γ-dicarboxylic acid diethyl ester:

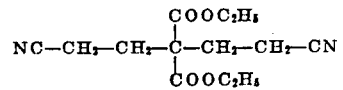

*Example 2*

1 part of metallic sodium is added to 1130 parts of cyano acetic acid ethyl ester. 1060 parts of acrylic acid nitrile are allowed to flow drop by drop into the mixture while stirring. The temperature is kept at 40° C. by cooling. The reaction mixture is allowed to stand for several hours in the course of which it solidifies to colorless crystals, melting at 36–37° C. and boiling at 221° C. under a pressure of 3.5 millimeters. The addition product constitutes γ-cyano-pimelic acid dinitrile-γ-carboxylic acid ethyl ester:

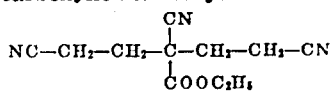

*Example 3*

1060 parts of acrylic acid nitrile are allowed to flow drop by drop into a mixture of 1300 parts of aceto acetic acid ethyl ester with 1 part of sodium while stirring and cooling to 30 to 40° C. The reaction mixture is then stirred for 6 hours at 60° C. When working up in the manner described in Example 1, there are obtained 950 parts of unchanged starting materials, 450 parts of a colorless liquid boiling at 135.5° C. under a pressure of 4 millimeters (ω-cyano ethyl aceto acetic acid ethyl ester) and 650 parts of an oily liquid, boiling at 191–193° C. under a pressure of 2 millimeters, which constitutes γ-(1'-acetyl)-pimelic acid dinitrile-γ-carboxylic acid ethyl ester and corresponds to the formula:

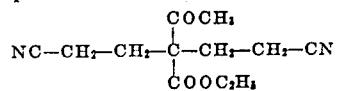

*Example 4*

106 parts of acrylic acid nitrile are added to a mixture of 117 parts of phenyl acetic acid nitrile with 0.5 part of metallic sodium at 50–60° C. There is formed a viscous pale-brown oil which crystallizes after being allowed to stand for several hours. By adding a small amount of methanol the formation of crystals may be favored. 175 parts of γ-cyano-γ-phenyl pimelic acid dinitrile:

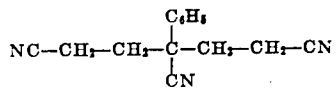

are thus obtained.

*Example 5*

A mixture of 55 parts of cyano acetic acid ethyl ester, 0.5 part of cyclohexylamine and 53 parts of acrylic acid nitrile is stirred for 5 hours at 50° C. By distilling the reaction mixture under reduced pressure there are obtained 46 parts of the compound described in Example 2.

The same compound may be prepared in the following manner:

110 parts of cyano acetic acid ethyl ester, 0.5 part of sodium hydroxide and 106 parts of acrylic acid nitrile are stirred at 40° C. 5 parts of water are added and carbon dioxide is introduced at 50° C. until it is no longer absorbed. The mixture is then dried with anhydrous sodium sulfate, filtered off and distilled.

*Example 6*

900 parts of acrylic acid butyl ester are allowed to flow drop by drop into a mixture of 510 parts of cyano acetic acid ethyl ester with 0.5 part of metallic sodium while stirring and cooling to 30–40° C. The temperature is then raised to 60° C., and the whole stirred for 6 hours. After the addition of a small amount of water, carbon dioxide is introduced until it is no longer absorbed.

The mixture is dried with anhydrous sodium sulfate and distilled in vacuo. After a small amount of starting material has been distilled off, there is obtained in excellent yields γ-cyano pimelic acid dibutyl ester-γ-carboxylic acid ethyl ester:

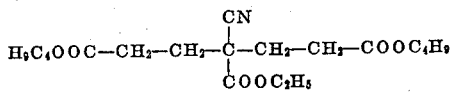

It boils at 202–203° C. under a pressure of 1.5 millimeters.

When using acrylic acid ethyl ester instead of the butyl ester, there is obtained γ-cyano pimelic acid diethyl ester-γ-carboxylic acid ethyl ester. (Boiling point 163–167° C. under 0.5 millimeter pressure.)

*Example 7*

650 parts of acrylic acid methyl ester are allowed to flow into a mixture of 390 parts of aceto acetic acid ethyl ester with 2 parts of metallic sodium at 45–50° C. while stirring. After having allowed the mixture to stand at 60° C. for 4 hours, 9 parts of hydrochloric acid are added. The mixture is dried and distilled. After unchanged acrylic acid methyl ester has been distilled off, there are obtained 741 parts of a colorless liquid boiling at 168–172° C. under 0.8 millimeter pressure. It constitutes γ-(1'-acetyl)-pimelic acid dimethyl ester-γ-carboxylic acid ethyl ester and corresponds to the following formula:

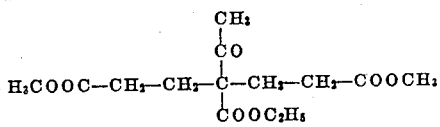

When using acrylid acid ethyl ester or butyl ester, there are obtained the corresponding pimelic acid diethyl ester (boiling point 192–193° C. under 2 millimeters pressure) or dibutyl ester (boiling point 200–208° C. under 2 millimeters pressure).

*Example 8*

1150 parts of acrylic acid methyl ester are allowed to flow slowly into a mixture of 950 parts of malonic acid diethyl ester with 9 parts of metallic sodium while stirring and cooling to 30–40° C. The reaction mixture is then stirred at 50° C. for five hours, neutralized by the addition of concentrated hydrochloric acid and distilled under reduced pressure. After unchanged acrylic acid methyl ester has been distilled off, there are obtained 1800 parts of pimelic acid dimethyl ester-γ,γ-dicarboxylic acid ethyl ester

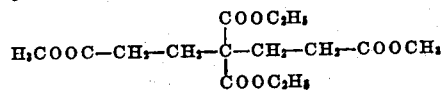

It boils at 180–190° C. under 1 millimeter pressure. The oily distillate solidifies to form white crystals.

Instead of acrylic acid methyl ester there may be used a corresponding amount of acrylic acid ethyl or butyl ester. There are thus obtained:

Pimelic acid diethyl ester-γ,γ-dicarboxylic acid ethyl ester (distilling at 192–197° C. at 2 millimeters pressure) or Pimelic acid dibutyl ester-γ,γ-dicarboxylic acid ethyl ester (distilling at 208–210° C. at 1.5 millimeters pressure).

What we claim is:

1. A process for the production of disubstituted pimelic acid dinitriles which consists in causing more than one molecular proportion of acrylic acid nitrile to act on one molecular proportion of an ester of a carboxylic acid which contains in α-position to the esterified carboxylic acid group a $CH_2$-group activated by a radicle which contains an atom having a multiple bond directly connected thereto, said atom being attached to said $CH_2$-group in the presence of an alkaline catalyst.

2. A process for the production of disubstituted pimelic acid dinitriles which consists in causing more than one molecular proportion of acrylic acid nitrile to act on one molecular proportion of an ethyl ester of a carboxylic acid which contains in α-position to the esterified carboxylic acid group a $CH_2$-group activated by a radicle which contains an atom having a multiple bond directly connected thereto, said atom being attached to said $CH_2$-group in the presence of an alkaline catalyst.

3. As a new compound, a substance of the formula

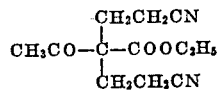

4. A process of introducing two β-cyanoethyl groups on the methylene carbon contiguous to the acetyl group of an acetoacetic ester, which comprises reacting acrylonitrile with an acetoacetic ester in the presence of an alkaline condensing agent.

5. A process of introducing two β-cyanoethyl groups on the methylene carbon contiguous to the acetyl group of ethyl acetoacetate which comprises reacting acrylonitrile with ethyl acetoacetate in the presence of an alkaline catalyst.

6. A process which comprises reacting in the presence of an alkaline condensing agent at least one molecular proportion of acrylonitrile and one molecular proportion of an ester of a carboxylic acid which contains in α-position to the esterified carboxylic acid group a $CH_2$-group activated by a radical which contains an atom having a multiple bond directly connected thereto, said atom being attached to said $CH_2$-group.

7. A process which comprises reacting in the presence of an alkaline condensing agent acrylonitrile and an ester of acetoacetic acid.

8. As a new compound, a β-cyanoethylated ester of acetoacetic acid having at least one β-cyanoethyl group attached to the carbon atom in α-position to the esterified carboxylic group.

9. A process which comprises reacting in the presence of an alkaline condensing agent more than one molecular proportion of acrylonitrile and one molecular proportion of a compound selected from the group having the formula $$R_1.CH_2.R_2$$

in which $R_1$ is selected from the group consisting of acyl, esterified carboxylic acid radical and CN, and in which $R_2$ is an esterified carboxylic acid radical.

GEORG WIEST.
HEINRICH GLASER.